United States Patent
Lee et al.

(10) Patent No.: US 11,283,108 B2
(45) Date of Patent: Mar. 22, 2022

(54) ELECTROLYTE FOR RECHARGEABLE LITHIUM BATTERY AND RECHARGEABLE LITHIUM BATTERY

(71) Applicant: SAMSUNG SDI CO., LTD., Yongin-si (KR)

(72) Inventors: Harim Lee, Yongin-si (KR); Hyejin Park, Yongin-si (KR); Myungheui Woo, Yongin-si (KR); Jin-Hyeok Lim, Yongin-si (KR); Hyunbong Choi, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 66 days.

(21) Appl. No.: 16/448,899

(22) Filed: Jun. 21, 2019

(65) Prior Publication Data

US 2020/0006810 A1    Jan. 2, 2020

(30) Foreign Application Priority Data

Jun. 29, 2018 (KR) .................. 10-2018-0075809

(51) Int. Cl.
*H01M 10/0567* (2010.01)
*H01M 10/0525* (2010.01)
(Continued)

(52) U.S. Cl.
CPC ....... *H01M 10/0567* (2013.01); *C07F 7/0834* (2013.01); *H01M 10/052* (2013.01);
(Continued)

(58) Field of Classification Search
CPC ......... H01M 10/0567; H01M 10/0525; H01M 10/0569; H01M 10/052; H01M 2200/30;
(Continued)

(56) References Cited

U.S. PATENT DOCUMENTS

| 2004/0002002 A1* | 1/2004 | Mizuta | H01G 9/035 |
| | | | 429/188 |
| 2008/0226977 A1* | 9/2008 | Kim | H01M 10/0569 |
| | | | 429/163 |

(Continued)

FOREIGN PATENT DOCUMENTS

| JP | 2004-134232 A | 4/2004 |
| JP | 2015-125949 A | 7/2015 |

(Continued)

OTHER PUBLICATIONS

Machine Translation of JP-2015125949-A from Espacenet originally published on Jul. 2015 to Kadota (Year: 2015).*

(Continued)

*Primary Examiner* — Ula C Ruddock
*Assistant Examiner* — Mary Grace Byram
(74) *Attorney, Agent, or Firm* — Lewis Roca Rothgerber Christie LLP

(57) ABSTRACT

Disclosed is an electrolyte for a rechargeable lithium battery including a non-aqueous organic solvent, a lithium salt, and an additive, wherein the additive is a compound represented by Chemical Formula 1. In Chemical Formula 1, each substituent is the same as in the detailed description. A rechargeable lithium battery includes: a positive electrode; a negative electrode; and the electrolyte.

Chemical Formula 1

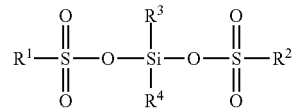

8 Claims, 1 Drawing Sheet

(51) Int. Cl.
*H01M 10/0569* (2010.01)
*C07F 7/08* (2006.01)
*H01M 10/052* (2010.01)

(52) U.S. Cl.
CPC ... *H01M 10/0525* (2013.01); *H01M 10/0569* (2013.01); *H01M 2220/30* (2013.01); *H01M 2300/0025* (2013.01); *H01M 2300/0028* (2013.01)

(58) Field of Classification Search
CPC ... H01M 2300/0028; H01M 2300/0025; C07F 7/0384
See application file for complete search history.

(56) References Cited

U.S. PATENT DOCUMENTS

2016/0027592 A1* 1/2016 Shimamoto ............ H01G 11/62
429/332
2016/0211550 A1* 7/2016 Cha ....................... H01M 4/587

FOREIGN PATENT DOCUMENTS

| JP | 2015125949 A * | 7/2015 |
| KR | 10-2015-0024224 A | 3/2015 |
| KR | 10-2015-0139847 A | 12/2015 |
| KR | 10-2017-0057939 A | 5/2017 |

OTHER PUBLICATIONS

Korean Intellectual Property Office Action for corresponding Korean Patent Application No. 10-2018-0075809, dated Aug. 14, 2020, 5 pages.

* cited by examiner

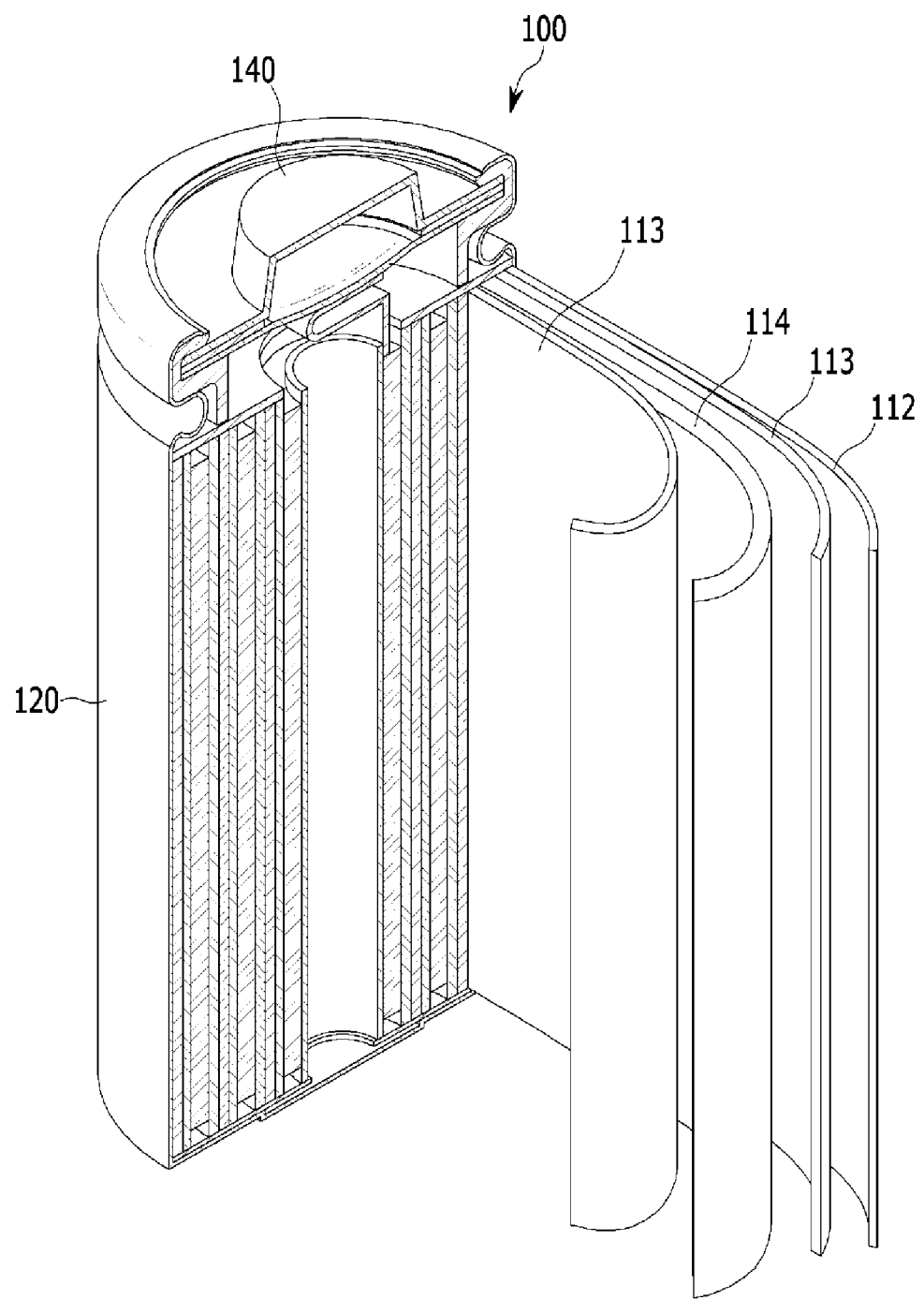

ELECTROLYTE FOR RECHARGEABLE LITHIUM BATTERY AND RECHARGEABLE LITHIUM BATTERY

CROSS-REFERENCE TO RELATED APPLICATION

This application claims priority to and the benefit of Korean Patent Application No. 10-2018-0075809 filed in the Korean Intellectual Property Office on Jun. 29, 2018, the entire contents of which are incorporated herein by reference.

BACKGROUND

1. Field

An electrolyte for a rechargeable lithium battery and a rechargeable lithium battery including the same are disclosed herein.

2. Description of the Related Art

A rechargeable lithium battery may be recharged and has three or more times as high energy density per unit weight as a lead storage battery, nickel-cadmium battery, nickel hydrogen battery, nickel zinc battery, and the like. It may be also charged at a high rate, and thus, is commercially manufactured for a laptop, a cell phone, an electric tool, an electric bike, and/or the like, and researches on improvement of additional energy density have been actively made.

Such a rechargeable lithium battery is manufactured by injecting an electrolyte into a battery cell, which includes a positive electrode including a positive active material capable of intercalating/deintercalating lithium ions and a negative electrode including a negative active material capable of intercalating/deintercalating lithium ions.

For example, an electrolyte includes an organic solvent in which a lithium salt is dissolved and critically determines stability and performance of a rechargeable lithium battery.

$LiPF_6$, which is used as a lithium salt of an electrolyte has a problem of reacting with an electrolytic solvent to promote depletion of a solvent and generate a large amount of gas. When $LiPF_6$ is decomposed, it generates LiF and $PF_5$, which leads to electrolyte depletion in the battery, thereby resulting in degradation in high temperature performance and poor safety.

There is a need for an electrolyte that suppresses or reduces side reactions of such a lithium salt and improves the performance of the battery.

SUMMARY

An embodiment of the present disclosure provides an electrolyte for a rechargeable lithium battery capable of improving high temperature stability and power characteristics.

Another embodiment provides a rechargeable lithium battery including the electrolyte for a rechargeable lithium battery.

An embodiment of the present disclosure provides an electrolyte for a rechargeable lithium battery including a non-aqueous organic solvent, a lithium salt, and an additive, wherein the additive includes a compound represented by Chemical Formula 1.

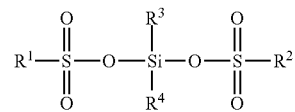

Chemical Formula 1

In Chemical Formula 1, $R^1$ to $R^4$ are independently a hydrogen, a cyano group, a halogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group.

$R^1$ to $R^4$ may independently be a substituted or unsubstituted C1 to C6 alkyl group, a substituted or unsubstituted C1 to C6 alkoxy group, a substituted or unsubstituted C2 to C6 alkenyl group, or a substituted or unsubstituted C2 to C6 alkynyl group.

$R^1$ to $R^4$ may independently be a C1 to C4 alkyl group which is substituted or unsubstituted with a halogen or cyano group, a C1 to C4 alkoxy group which is substituted or unsubstituted with a halogen or a cyano group, a C2 to C4 alkenyl group which is substituted or unsubstituted with a halogen or cyano group, or a C2 to C4 alkynyl group which is substituted or unsubstituted with a halogen or cyano group.

The compound represented by Chemical Formula 1 may be included in an amount of about 0.05 wt % to about 3 wt % based on a total weight of the electrolyte for a rechargeable lithium battery.

The compound represented by Chemical Formula 1 may be included in an amount of about 0.1 wt % to about 2 wt % based on a total weight of the electrolyte for a rechargeable lithium battery.

The additive may further include at least one additional additive selected from vinylethylene carbonate (VEC), fluoroethylene carbonate (FEC), propenesultone (PST), propanesultone (PS), lithiumtetrafluoroborate ($LiBF_4$), lithium bis(oxalato)borate (LiBOB), succinonitrile (SN), lithium difluorophosphate ($LiPO_2F_2$), 2-fluoro biphenyl (2-FBP), and a combination thereof.

The additional additive may be included in an amount of about 0.1 wt % to about 10 wt % based on a total weight of the electrolyte for a rechargeable lithium battery.

Another embodiment provides a rechargeable lithium battery including a positive electrode; a negative electrode facing the positive electrode; and the electrolyte between the positive electrode and the negative electrode.

The rechargeable lithium battery may realize improved high-temperature stability and power characteristics.

BRIEF DESCRIPTION OF THE DRAWING

The accompanying drawing, together with the specification, illustrates embodiments of the subject matter of the present disclosure, and, together with the description, serve to explain principles of embodiments of the subject matter of the present disclosure.

The accompanying is a schematic view showing a rechargeable lithium battery according to an embodiment of the present disclosure.

DESCRIPTION OF AT LEAST SOME OF THE SYMBOLS

100: rechargeable lithium battery
112: negative electrode
113: separator
114: positive electrode
120: battery case
140: sealing member

DETAILED DESCRIPTION

Hereinafter, embodiments of the present disclosure are illustrated in more detail. However, these embodiments are exemplary, the present disclosure is not limited thereto, and the present disclosure is defined by the scope of claims, and equivalents thereof.

As used herein, when a definition is not otherwise provided, the term "substituted" refers to replacement of a hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an electrolyte for a rechargeable lithium battery according to an embodiment is described.

An electrolyte for a rechargeable lithium battery according to an embodiment includes a non-aqueous organic solvent, a lithium salt, and an additive, wherein the additive includes a compound represented by Chemical Formula 1.

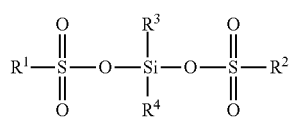

Chemical Formula 1

In Chemical Formula 1, $R^1$ to $R^4$ are independently a hydrogen, a cyano group, a halogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group.

The compound represented by Chemical Formula 1 includes two sulfonate groups in one molecule and thus has a beneficial LUMO energy level for a reduction reaction in an electrolyte and, accordingly, may be easily decomposed on the surface of a negative electrode, and thus, form a firm SEI (solid electrolyte interface) film having excellent ion conductivity thereon. The initial formation of the SEI film may suppress or reduce decomposition of the negative electrode surface which may occur during the high temperature cycles and prevent or reduce an oxidation reaction of the electrolyte, and thus, decrease a resistance increase rate in the rechargeable lithium battery.

For example, $R^1$ to $R^4$ may independently be a substituted or unsubstituted C1 to C6 alkyl group, a substituted or unsubstituted C1 to C6 alkoxy group, a substituted or unsubstituted C2 to C6 alkenyl group, or a substituted or unsubstituted C2 to C6 alkynyl group.

For example, $R^1$ to $R^4$ may independently be a C1 to C4 alkyl group that is substituted or unsubstituted with a halogen or cyano group, a C1 to C4 alkoxy group that is substituted or unsubstituted with a halogen or a cyano group, a C2 to C4 alkenyl group that is substituted or unsubstituted with a halogen or cyano group, or a C2 to C4 alkynyl group that is substituted or unsubstituted with a halogen or cyano group.

The compound represented by Chemical Formula 1 may be included in an amount of about 0.05 wt % to about 3 wt %, about 0.1 wt % to about 3 wt %, or, for example, about 0.1 wt % to about 2 wt % based on a total weight of the electrolyte for a rechargeable lithium battery.

When the amount of the compound represented by Chemical Formula 1 is in the foregoing ranges, initial resistance and a resistance increase of storage characteristics at a high temperature may be suppressed or reduced, and thereby, power characteristics of a rechargeable lithium battery including the compound represented by Chemical Formula 1 may be improved.

For example, when the compound represented by Chemical Formula 1 is included in an amount of less than about 0.05 wt %, storage characteristics at a high temperature may be deteriorated or reduced, while when it is included in an amount greater than about 3 wt %, interfacial resistance may be increased.

The additive according to an embodiment may further include at least one additional additive of vinylethylene carbonate (VEC), fluoroethylene carbonate (FEC), propenesultone (PST), propanesultone (PS), lithiumtetrafluoroborate (LiBF$_4$), lithium bis(oxalato)borate (LiBOB), succinonitrile (SN), lithium difluorophosphate (LiPO$_2$F$_2$), 2-fluoro biphenyl (2-FBP), and a combination thereof.

Herein, the additional additive may be included in an amount of about 0.1 wt % to about 10 wt %, about 0.1 wt % to about 5 wt %, or, for example, about 1 wt % to about 5 wt % based on a total weight of the electrolyte for a rechargeable lithium battery.

When the additional additive is used within the foregoing ranges, a rechargeable lithium battery including the additional additive, having effectively having suppressed or reduced battery resistance increase, and having much improved cycle-life characteristics may be realized.

For example, in order to improve cycle-life of a rechargeable lithium battery, vinylene carbonate or an ethylene carbonate-based compound of Chemical Formula 2 may be further added as an additive for improving cycle-life.

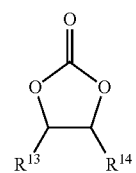

Chemical Formula 2

In Chemical Formula 2, $R^{13}$ and $R^{14}$ are the same or different and selected from a hydrogen, a halogen, a cyano group (CN), a nitro group ($NO_2$), and a fluorinated C1 to C5 alkyl group, provided that at least one of $R^{13}$ and $R^{14}$ is a halogen, a cyano group (CN), a nitro group ($NO_2$), and a fluorinated C1 to C5 alkyl group and $R^{13}$ and $R^{14}$, and are not simultaneously hydrogen.

Examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within a suitable or appropriate range.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, propylpropionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. In addition, the ketone-based solvent may include cyclohexanone, and/or the like. The alcohol-based solvent may include ethanol, isopropyl alcohol, and/or the like, and the aprotic solvent may include nitriles such as R—CN (wherein R is a hydrocarbon group having a C2 to C20 linear, branched, or cyclic structure and may include a double bond, an aromatic ring, or an ether bond), and/or the like, dioxolanes such as 1,3-dioxolane and/or the like, sulfolanes, and/or the like.

The non-aqueous organic solvent may be used alone or in a mixture. When the organic solvent is used in a mixture, the mixture ratio may be controlled in accordance with a suitable or desirable battery performance.

The carbonate-based solvent is prepared by mixing a cyclic carbonate and a linear carbonate. When the cyclic carbonate and linear carbonate are mixed together to a volume ratio of about 1:1 to about 1:9, an electrolyte performance may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed to a volume ratio of about 1:1 to about 30:1.

The aromatic hydrocarbon-based organic solvent may be an aromatic hydrocarbon-based compound of Chemical Formula 3.

Chemical Formula 3

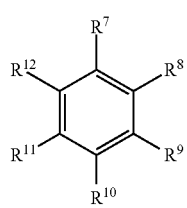

In Chemical Formula 3, $R^7$ to $R^{12}$ are the same or different and are selected from a hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The lithium salt dissolved in the non-aqueous organic solvent supplies lithium ions in a battery, enables a basic operation of a rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_6)_2$, $Li(CF_3SO_2)_2N$, $LiN(SO_3C_2F_6)_2$, $LiC_4F_9SO_3$, $LiClO_4$, $LiAlO_2$, $LiAlCl_4$, $LiN(C_xF_{2x-1}SO_2)(C_yF_{2y+1}SO_2)$ (wherein x and y are natural numbers, for example, an integer in a range of 1 to 20), LiCl, LiI and $LiB(C_2O_4)_2$ (lithium bis(oxalato) borate; LiBOB). The lithium salt may be used in a concentration in a range of about 0.1 M to about 2.0 M. When the lithium salt is included at the above concentration range, an electrolyte may have excellent performance and lithium ion mobility due to suitable or optimal electrolyte conductivity and viscosity.

Another embodiment provides a rechargeable lithium battery including a positive electrode; a negative electrode; and the electrolyte.

The positive electrode includes a current collector and a positive active material layer on the current collector and including a positive active material.

The positive active material may include lithiated intercalation compounds that reversibly intercalate and deintercalate lithium ions.

For example, at least one composite oxide of lithium and a metal of cobalt, manganese, nickel, or a combination thereof may be used.

Examples of the positive active material may include a compound represented by one of the following chemical formulae.

$Li_aA_{1-b}X_bD_2$ (0.90≤a≤1.8, 0≤b≤0.5); $Li_aA_{1-b}X_bO_{2-c}D_b$ (0.90≤a≤1.8, 0 b≤0.5, 0≤c≤0.05); $Li_aE_{1-b}X_bO_{2-c}D_b$ (0.90≤a≤1.8, 0≤b≤0.5, 0≤c≤0.05); $Li_aE_{2-b}X_bO_{4-c}D_b$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤a≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤a≤2); $Li_aNi_bE_cG_dO_2$ (0.90≤a≤1.8, 0≤b≤0.9, 0≤c≤0.5, 0.001≤d≤0.1); $Li_aNi_bCO_cMn_dG_eO_2$ (0.90≤a≤1.8, 0≤b≤0.9, 0≤c≤0.5, 0≤d 0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, $0 \leq g \leq 0.5$); $QO_2$; $QS_2$; $LiOS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$).

In the foregoing chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The foregoing compounds may have a coating layer on the surface, or may be mixed with another compound having a coating layer. The coating layer may include at least one coating element compound selected from an oxide of the coating element, a hydroxide of the coating element, an oxyhydroxide of the coating element, an oxycarbonate of the coating element, and a hydroxy carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be in a method having no adverse influence (or substantially no adverse influence) on properties of a positive active material by using these elements in the compound. For example, the method may include any suitable coating method (e.g., spray coating, dipping, etc.), but is not illustrated in more detail here because it would be readily recognizable to those skilled in the related field upon review of the present disclosure.

Examples of the positive active material according to an embodiment may include $Li_xNi_yCo_zAl_{1-y-z}O_2$ ($1 \leq x \leq 1.2$, $0.5 \leq y \leq 1$, and $0 \leq z \leq 0.5$).

The positive active material may be included in an amount of about 90 wt % to about 98 wt % based on a total weight of the positive active material layer.

In an embodiment of the present disclosure, the positive active material layer may include a binder and a conductive material. Herein, the binder and the conductive material may be included in an amount of about 1 wt % to about 5 wt %, respectively based on a total weight of the positive active material layer.

The binder improves binding properties of positive active material particles with one another and with a current collector. Examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material is included to provide electrode conductivity. Any suitable electrically conductive material may be used as a conductive material unless it causes a chemical change (e.g., an undesirable chemical change to one or more components of the rechargeable lithium battery). Examples of the conductive material may include a carbon-based material such as natural graphite, artificial graphite, carbon black, acetylene black, ketjen black, a carbon fiber, and/or the like; a metal-based material of a metal powder or a metal fiber including copper, nickel, aluminum, silver, and/or the like; a conductive polymer such as a polyphenylene derivative; or a mixture thereof.

The current collector may use Al, but the current collector is not limited thereto.

The negative electrode includes a current collector and a negative active material layer formed on the current collector and including a negative active material.

The negative active material may include a material that reversibly intercalates/deintercalates lithium ions, a lithium metal, a lithium metal alloy, a material being capable of doping/dedoping lithium, and/or a transition metal oxide.

The material that reversibly intercalates/deintercalates lithium ions may include a carbon material. The carbon material may be any suitable, generally-used carbon-based negative active material in a rechargeable lithium ion battery. Examples thereof may include crystalline carbon, amorphous carbon, or a mixture thereof. The crystalline carbon may be non-shaped (e.g., not having a defined shape), or sheet, flake, spherical, or fiber shaped natural graphite or artificial graphite. The amorphous carbon may be a soft carbon, a hard carbon, a mesophase pitch carbonization product, fired coke, and/or the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may be Si, a Si—C composite, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), and/or the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, and/or lithium titanium oxide.

In the negative active material layer, the negative active material may be included in an amount of about 95 wt % to about 99 wt % based on a total weight of the negative active material layer.

In an embodiment of the present disclosure, the negative active material layer includes a binder, and, optionally, a conductive material. In the negative active material layer, a content of the binder may be about 1 wt % to about 5 wt % based on a total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. Embodiments of the binder include a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, ethylenepropylenecopolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as a negative electrode binder, a cellulose-based compound may be further used to provide viscosity as a thickener. Embodiments of the cellulose-based compound include one or more of carboxymethyl cellulose, hydroxypropylmethyl cellulose, methyl cellulose, or alkali metal salts thereof. The alkali metals may be Na, K, or Li. Such a thickener may be included in an amount of about 0.1 to about 3 parts by weight based on 100 parts by weight of the negative active material.

The conductive material is included to provide electrode conductivity (e.g., electrical conductivity). Any suitable electrically conductive material may be used as a conductive material unless it causes a chemical change (e.g., an undesirable chemical change of one or more components of the rechargeable lithium battery). Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The rechargeable lithium battery may further include a separator between the negative electrode and the positive electrode, depending on a type or kind of the rechargeable lithium battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Referring to the accompanying drawing, a rechargeable lithium battery 100 according to an embodiment includes a battery cell including a negative electrode 112, a positive electrode 114 facing the negative electrode 112, a separator 113 interposed between the negative electrode 112 and the positive electrode 114, an electrolyte (not shown) for a rechargeable lithium battery impregnating the negative electrode 112, the positive electrode 114, and the separator 113, a battery case 120 housing the battery cell, and a sealing member 140 sealing the battery case 120.

Hereinafter, examples of the present disclosure and comparative examples are described. These examples, however, are not in any sense to be interpreted as limiting the scope of the present disclosure.

Manufacture of Rechargeable Lithium Battery Cell

Example 1

A positive active material slurry was prepared by mixing $LiNi_{0.8}Co_{0.15}Al_{0.05}O_2$ as a positive active material, polyvinylidene fluoride as a binder, and ketjen black as a conductive material at a weight ratio of 97.3:1.4:1.3 and dispersing the mixture in N-methyl pyrrolidone.

The positive active material slurry was coated on a 15 μm-thick Al foil, dried at 100° C., and pressed to manufacture a positive electrode.

Additionally, a negative active material slurry was prepared by mixing graphite as a negative active material, polyvinylidene fluoride as a binder, and ketjen black as a conductive material in a weight ratio of 98:1:1 and then, dispersing the mixture in N-methyl pyrrolidone.

The negative active material slurry was coated on a 10 μm-thick Cu foil, dried at 100° C., and pressed to manufacture a negative electrode.

The positive and negative electrodes, a 25 μm-thick polyethylene separator, and an electrolyte were used to manufacture a rechargeable lithium battery cell.

The electrolyte has a following composition.
Electrolyte Composition
Salt: 1.5 M $LiPF_6$
Solvent: ethylene carbonate: fluoroethylene carbonate: dimethyl carbonate (EC:FEC:DMC=a volume ratio of 20:20:60)
Additives: 0.5 wt % of Compound 1-1, 3.7 wt % of an additive including a combination of $LiBF_4$, LiBOB, $LiPO_2F_2$, and SN

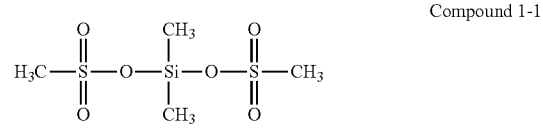

Compound 1-1

(Herein, in the electrolyte composition, "wt %" is based on a total weight of an electrolyte (a lithium salt+a non-aqueous organic solvent+an additive))

Example 2

A rechargeable lithium battery cell was manufactured according to substantially the same method as Example 1 except that the amount of the compound of Compound 1-1 was changed into 1 wt %.

Comparative Example 1

A rechargeable lithium battery cell was manufactured according to substantially the same method as Example 1 except that the additive was not added.

Comparative Example 2

A rechargeable lithium battery cell was manufactured according to substantially the same method as Example 1 except that a compound represented by Chemical Formula a was used in an amount of 1 wt % instead of the compound represented by Chemical Formula 1-1 in the composition of the additives.

Chemical Formula a

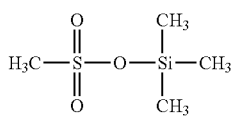

Evaluation 1: Energy Level Evaluation

HOMO and LUMO energy levels of the compounds according to the Examples and the Comparative Examples were evaluated according to the methods shown in Table 1, and the results are shown in Table 2.

TABLE 1

| Method of evaluating a HOMO energy level | Each compound was diluted to a concentration of 1 × 10$^{-5}$M in CHCl$_3$, a UV absorption spectrum thereof was measured by using a Varian Cary 5000 UV-Vis-NIR spectrophotometer at room temperature, and a HOMO energy level thereof was calculated by using an optical bandgap (Eg) from an edge of the absorption spectrum |
| --- | --- |
| Method of evaluating a LUMO energy level | A potential (V)-current (A) graph of each compound was obtained by using cyclic voltammetry (CV) (Electrolyte: 0.1M Bu$_4$NClO$_4$/ Solvent: CH$_2$Cl$_2$/Electrode: 3 electrode system (Working electrode: GC, Reference electrode: Ag/AgCl, Auxiliary electrode: Pt)), and a reduction onset of the graph was used to calculate a LUMO energy level of each compound. |

TABLE 2

| Compound | HOMO energy level (eV) | LUMO energy level (eV) |
| --- | --- | --- |
| Compound 1-1 | −10.236 | −0.091 |
| Compound a | −10.177 | 0.104 |

Referring to Tables 1 and 2, the additive compounds prepared by introducing two sulfonate groups according to the Examples of the present disclosure have a lower LUMO energy level, and thus, are expected to be more easily reduced and decomposed on the surface of a negative electrode than the additive compounds prepared by introducing one sulfonate group according to the Comparative Examples.

Evaluation 2: Evaluation of Storage Characteristics at High Temperature

Each rechargeable lithium battery cell according to Examples 1 and 2 and Comparative Examples 1 and 2 was stored at 60° C. in a full charge state (SOC, state of charge=100%) for 30 days, and a resistance increase rate during the storage at the high temperature of 60° C. was evaluated every 10 days. The results are shown in Table 3.

An initial formation condition was a constant current (CC) charge to 3.6 V at a current of 0.2 C and a discharge to 2.5 V at the first cycle and then, a CC charge to 4.2 V at a current of 0.2 C and a discharge down to 2.5 V at the second cycle, through which an oxide film was formed on the electrode surface.

DC resistance (DC-IR) was measured in the following method.

The DC resistance (DC-IR) was calculated from each current difference and voltage difference when different currents were applied to the cells.

A constant current discharge at 10 A for 10 seconds in the full charge state was performed.

Subsequently, after a constant current discharge at 1 A for 10 seconds, a constant current discharge at 10 A for 4 seconds was performed.

The DC resistance (DC-IR) was calculated from data of 18 seconds and 23 seconds according to $\Delta R=\Delta V/\Delta I$.

A resistance increase rate (%) is a percentage of DC-IR after the storage for 30 days relative to DC-IR before the high temperature storage.

TABLE 3

| | 60° C. | | | |
| --- | --- | --- | --- | --- |
| | Before high temperature storage | Δ DC-IR (%) | | |
| | DC-IR (mOhm) | 10 D | 20 D | 30 D |
| Comparative Example 1 | 19.48 | 28 | 57 | 83 |
| Comparative Example 2 | 18.93 | 24 | 49 | 77 |
| Example 1 | 18.32 | 22 | 43 | 68 |
| Example 2 | 18.74 | 21 | 42 | 65 |

Referring to Table 3, Examples 1 and 2 using the additives according to an embodiment exhibited low DC resistance during the storage at a high temperature of 60° C. as well as low DC resistance before the high temperature storage as compared with Comparative Examples 1 and 2.

Accordingly, when the compound represented by Chemical Formula 1 was used as an additive, anti-resistance (e.g., a reduced resistance increase) at a high temperature of a battery cell in a charged state was improved.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the FIGURE. It will be understood that the spatially relative terms are intended to encompass different orientations of the device in use or in operation, in addition to the orientation depicted in the FIGURE. For example, if the device in the FIGURE is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the subject matter of the present disclosure has been described in connection with what is presently considered to be practical example embodiments, it is to be understood that the present disclosure is not limited to the disclosed embodiments. On the contrary, it is intended to cover various modifications and equivalent arrangements included within the spirit and scope of the appended claims, and equivalents thereof.

What is claimed is:

1. An electrolyte for a rechargeable lithium battery, comprising
a non-aqueous organic solvent, a lithium salt, and an additive,
wherein the additive comprises a compound represented by Chemical Formula 1:

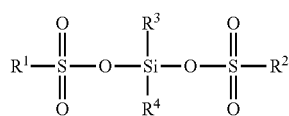

Chemical Formula 1 wherein, in Chemical Formula 1,
$R^1$ and $R^2$ are independently a hydrogen, a halogen, an unsubstituted C1 to C10 alkyl group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and
$R^3$ and $R^4$ are independently a hydrogen, a cyano group, a halogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group.

2. The electrolyte for a rechargeable lithium battery of claim 1, wherein the $R^1$ and $R^2$ are independently an unsubstituted C1 to C6 alkyl group, a substituted or unsubstituted C2 to C6 alkenyl group, or a substituted or unsubstituted C2 to C6 alkynyl group, and
wherein the $R^3$ and $R^4$ are independently a substituted or unsubstituted C1 to C6 alkyl group, a substituted or unsubstituted C1 to C6 alkoxy group, a substituted or unsubstituted C2 to C6 alkenyl group, or a substituted or unsubstituted C2 to C6 alkynyl group.

3. The electrolyte for a rechargeable lithium battery of claim 1, wherein $R^1$ and $R^2$ are independently an unsubstituted C1 to C4 alkyl group, a C2 to C4 alkenyl group which is unsubstituted or substituted with a halogen or cyano group, or a C2 to C4 alkynyl group which is unsubstituted or substituted with a halogen or cyano group, and
wherein $R^3$ and $R^4$ are independently a C1 to C4 alkyl group which is unsubstituted or substituted with a halogen or cyano group, a C1 to C4 alkoxy group which is unsubstituted or substituted with a halogen or a cyano group, a C2 to C4 alkenyl group which is unsubstituted or substituted with a halogen or cyano group, or a C2 to C4 alkynyl group which is unsubstituted or substituted with a halogen or cyano group.

4. The electrolyte for a rechargeable lithium battery of claim 1, wherein the compound represented by Chemical Formula 1 is included in an amount of 0.05 wt % to 3 wt % based on a total weight of the electrolyte for a rechargeable lithium battery.

5. The electrolyte for a rechargeable lithium battery of claim 1, wherein the compound represented by Chemical Formula 1 is included in an amount of 0.1 wt % to 2 wt % based on a total weight of the electrolyte for a rechargeable lithium battery.

6. The electrolyte for a rechargeable lithium battery of claim 1, wherein the additive further comprises at least one additional additive of vinylethylene carbonate (VEC), fluoroethylene carbonate (FEC), propenesultone (PST), propanesultone (PS), lithiumtetrafluoroborate (LiBF$_4$), lithium bis(oxalato)borate (LiBOB), succinonitrile (SN), lithium difluorophosphate (LiPO$_2$F$_2$), 2-fluoro biphenyl (2-FBP), and a combination thereof.

7. The electrolyte for a rechargeable lithium battery of claim 6, wherein the additional additive is included in an amount of 0.1 wt % to 10 wt % based on a total weight of the electrolyte for a rechargeable lithium battery.

8. A rechargeable lithium battery, comprising
a positive electrode;
a negative electrode facing the positive electrode; and
the electrolyte for a rechargeable lithium battery of claim 1 between the positive electrode and the negative electrode.

\* \* \* \* \*